(12) United States Patent
Bryant

(10) Patent No.: US 8,684,115 B2
(45) Date of Patent: Apr. 1, 2014

(54) VEHICLE AND A MODULAR DRIVE APPARATUS FOR THE VEHICLE

(75) Inventor: Wade W. Bryant, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/495,213

(22) Filed: Jun. 13, 2012

(65) Prior Publication Data
US 2013/0333966 A1   Dec. 19, 2013

(51) Int. Cl.
*B60K 1/02* (2006.01)

(52) U.S. Cl.
USPC ............................ 180/65.51; 180/6.5; 180/253

(58) Field of Classification Search
USPC ........... 180/65.1, 65.51, 65.6, 6.2, 6.38, 6.48, 180/6.5, 6.58, 6.62, 218, 219, 220, 252, 253
See application file for complete search history.

(56) References Cited

U.S. PATENT DOCUMENTS

| | | | | |
|---|---|---|---|---|
| 3,154,162 A * | 10/1964 | McCaleb et al. | ............. | 180/6.66 |
| 5,547,038 A * | 8/1996 | Madwed | ........................ | 180/253 |
| 5,934,397 A * | 8/1999 | Schaper | .................... | 180/65.245 |
| 6,830,114 B2 * | 12/2004 | Hammonds | .................... | 180/6.2 |
| 7,296,643 B2 * | 11/2007 | Philipson | ..................... | 180/65.1 |
| 7,849,945 B2 * | 12/2010 | Ross et al. | .................. | 180/65.51 |
| 8,186,461 B2 * | 5/2012 | Hammonds | .................. | 180/6.48 |
| 2006/0037787 A1 * | 2/2006 | Hammonds | .................. | 180/6.48 |
| 2007/0080000 A1 * | 4/2007 | Tobey et al. | .................... | 180/21 |
| 2010/0181135 A1 * | 7/2010 | Sbarro | .......................... | 180/253 |

* cited by examiner

*Primary Examiner* — John Walters
*Assistant Examiner* — Brian Swenson
(74) *Attorney, Agent, or Firm* — Quinn Law Group, PLLC

(57) ABSTRACT

A vehicle and a modular drive apparatus for the vehicle are disclosed. The apparatus includes a wheel assembly rotatable about a central axis in first and second directions. The wheel assembly is also pivotable about a pivot axis transverse to the central axis in third and fourth directions. The apparatus includes an electric motor coupled to the wheel assembly for rotating the wheel assembly in the first and second directions. The apparatus includes a braking device coupled to the wheel assembly for braking the wheel assembly. The apparatus includes a steering mechanism coupled to the wheel assembly for pivoting the wheel assembly in the third and fourth directions. The apparatus includes a housing receiving the wheel assembly, the electric motor, the braking device, and the steering mechanism to define a self-contained unit for attaching to and detaching from the vehicle to provide interchangeability of the self-contained unit.

20 Claims, 6 Drawing Sheets

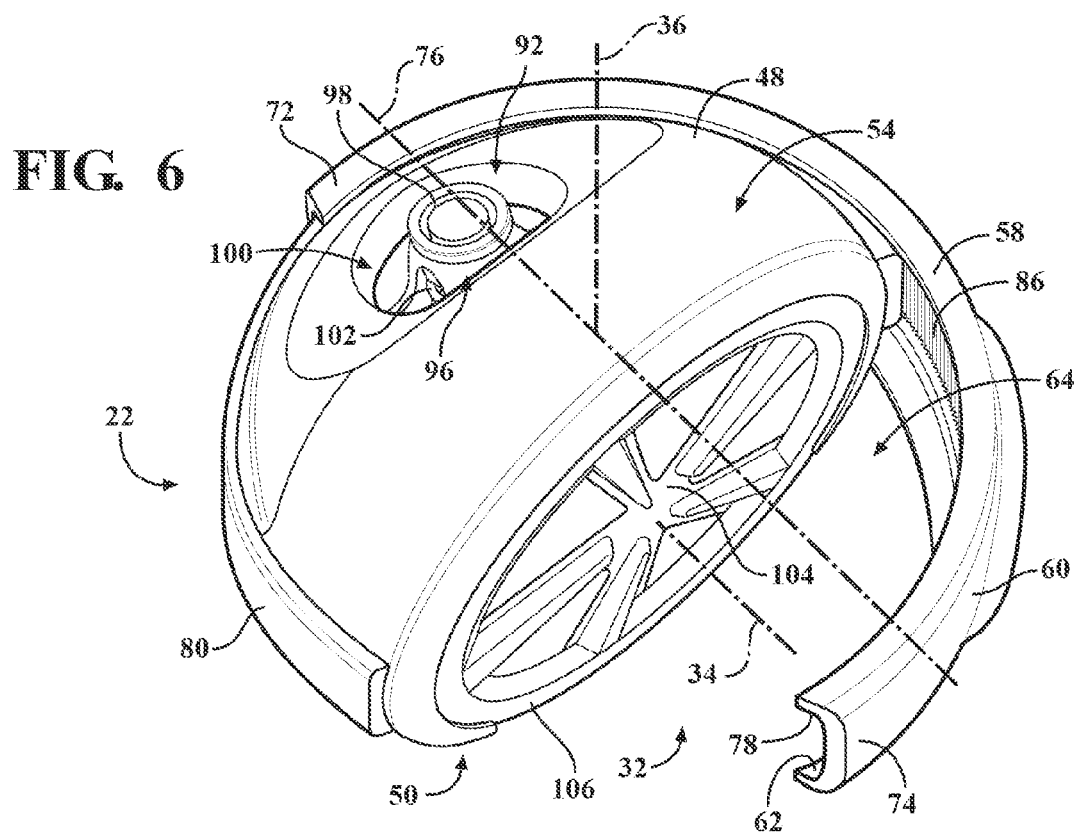
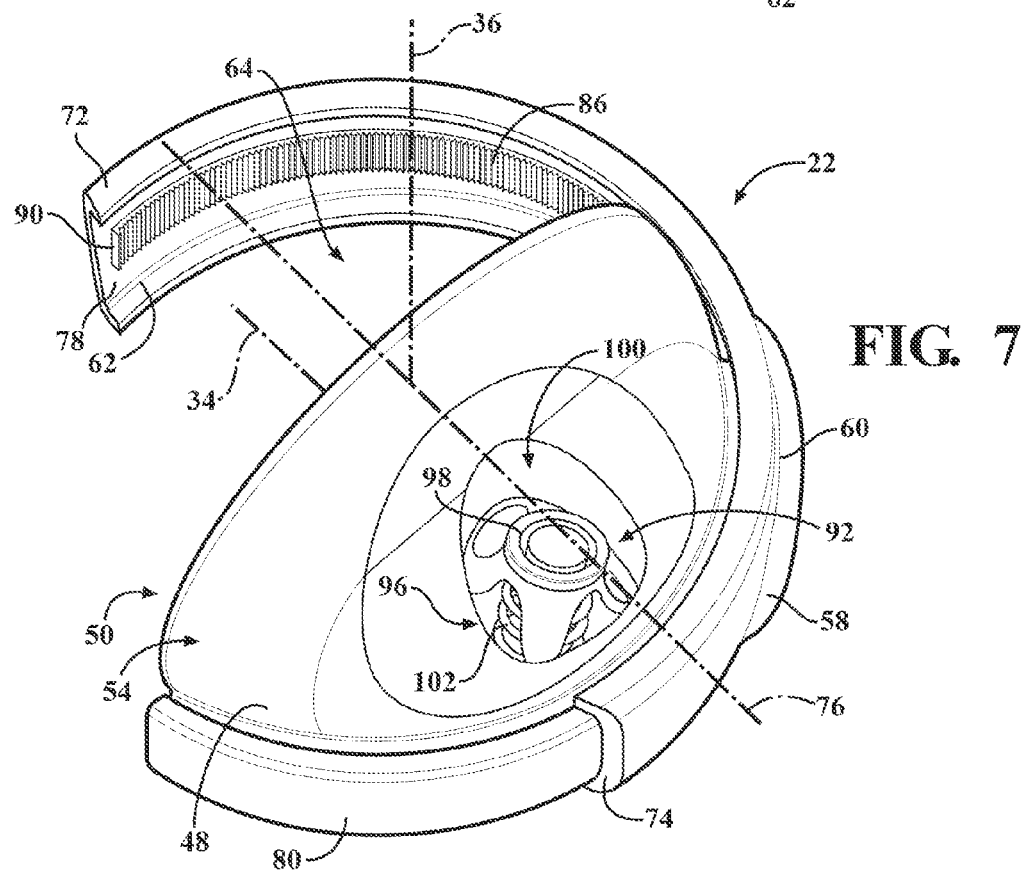

VEHICLE AND A MODULAR DRIVE APPARATUS FOR THE VEHICLE

TECHNICAL FIELD

The present disclosure relates to a vehicle and a modular drive apparatus for the vehicle.

BACKGROUND

Vehicles are commonly used to transport a driver and passengers to a designated location. A vehicle, such as a truck and a car, include numerous parts to propel the vehicle. For example, some vehicles include a chassis with an engine supported by the chassis and a plurality of wheels coupled to the chassis for moving the vehicle. Furthermore, some vehicles include a steering mechanism supported by the chassis and coupled to the wheels for steering the vehicle. In addition, these vehicles include a suspension mechanism supported by the chassis and coupled to the wheels. Additionally, these vehicles include a drivetrain having a differential, drive shafts, etc. which can add complexity to the vehicle's structure. Typically, these parts are individually attached to the chassis and removable from the chassis independently of each other.

SUMMARY

The present disclosure provides a vehicle including a support structure and a wheel assembly coupled to the support structure. The wheel assembly is rotatable about a central axis in a first direction and a second direction opposite the first direction for moving the support structure forward and backward. The wheel assembly is also pivotable about a pivot axis transverse to the central axis in a third direction and a fourth direction opposite the third direction for moving the support structure leftwardly and rightwardly. The vehicle further includes an electric motor coupled to the wheel assembly for rotating the wheel assembly in the first and second directions. The vehicle also includes a braking device coupled to the wheel assembly for braking the wheel assembly. The vehicle also includes a steering mechanism coupled to the wheel assembly for pivoting the wheel assembly in the third and fourth directions. The vehicle further includes a housing receiving the wheel assembly, the electric motor, the braking device, and the steering mechanism to define a self-contained unit attachable to and detachable from the support structure for providing interchangeability of the self-contained unit.

The present disclosure also provides a modular drive apparatus for a vehicle. The apparatus includes a wheel assembly rotatable about a central axis in a first direction and a second direction opposite the first direction for moving the vehicle forward and backward. The wheel assembly is also pivotable about a pivot axis transverse to the central axis in a third direction and a fourth direction opposite the third direction for moving the vehicle leftwardly and rightwardly. The apparatus further includes an electric motor coupled to the wheel assembly for rotating the wheel assembly in the first and second directions. The apparatus also includes a braking device coupled to the wheel assembly for braking the wheel assembly. Furthermore, the apparatus includes a steering mechanism coupled to the wheel assembly for pivoting the wheel assembly in the third and fourth directions. In addition, the apparatus includes a housing receiving the wheel assembly, the electric motor, the braking device, and the steering mechanism to define a self-contained unit for attaching to and detaching from the vehicle to provide interchangeability of the self-contained unit.

The present disclosure further provides a vehicle including a support structure. The support structure includes a front end and a back end spaced from each other along a longitudinal axis. The vehicle includes a wheel assembly coupled to the support structure. The wheel assembly is rotatable about a central axis in a first direction and a second direction opposite the first direction for moving the support structure forward and backward. The wheel assembly is also pivotable about a pivot axis transverse to the central axis in a third direction and a fourth direction opposite the third direction for moving the support structure leftwardly and rightwardly. The vehicle also includes a first electric motor coupled to the wheel assembly for rotating the wheel assembly in the first and second directions. The vehicle further includes a braking device coupled to the wheel assembly for braking the wheel assembly and a steering mechanism coupled to the wheel assembly for pivoting the wheel assembly in the third and fourth directions. The vehicle also includes a housing defining a cavity receiving the wheel assembly, the first electric motor, the braking device, and the steering mechanism to define a self-contained unit attachable to and detachable from the support structure for providing interchangeability of the self-contained unit. The vehicle also includes a support coupled to the housing for supporting the self-contained unit. The support is disposed outside of the housing and attachable to and detachable from the support structure concurrently with the self-contained unit. The support includes a first track mounted thereon for guiding the housing along the support during pivoting of the housing about the pivot axis. The housing includes a second track mounted to the housing outside of the cavity such that the second track and the housing concurrently pivot about the pivot axis. The second track cooperates with the first track for guiding the second track along the first track during pivoting of the housing about the pivot axis. The steering mechanism includes a cog cooperating with the first track and a second electric motor coupled to the cog for moving the cog along the first track to pivot the housing about the pivot axis independently of the support. The vehicle further includes a suspension mechanism disposed in the cavity of the housing to further define the self-contained unit. The suspension mechanism includes a shock absorber coupled to the wheel assembly and the housing for damping movement of the support structure along the pivot axis. The wheel assembly includes a hub coupled to the first electric motor and a tire attached to the hub. The hub and the tire are concurrently rotatable about the central axis in the first and second directions in response to actuation of the first electric motor. The steering mechanism pivots the tire to a first position in the third direction transverse to the longitudinal axis and a second position in the fourth direction transverse to the longitudinal axis. The steering mechanism also pivots the tire to an intermediate position substantially parallel to the longitudinal axis to represent an angle of about 0°. The tire is pivotable about the pivot axis relative to the intermediate position to the first position in a first angle from about 0° to about 90° in the third direction. The tire also is pivotable about the pivot axis relative to the intermediate position to the second position in a second angle from about 0° to about −90° in the fourth direction. The vehicle also includes a control system disposed in the cavity of the housing to further define the self-contained unit. The control system is in communication with the first and second electric motors and the braking device for controlling actuation of the first and second electric motors and the braking device. The vehicle further includes a battery attached to the support structure for supplying current to the first and second electric motors, the braking device, and the control system. The housing, the wheel assembly, the first and second electric motors, the braking device, the steering mechanism, the suspension mechanism, and the control system are pivotable concurrently with each other about the pivot axis in the third and fourth directions independently of the support.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 6 is a schematic perspective view of a self-contained unit and a tire in a first position.

FIG. 7 is a schematic perspective view of the self-contained unit and the tire in a second position.

DETAILED DESCRIPTION

Figure 1:
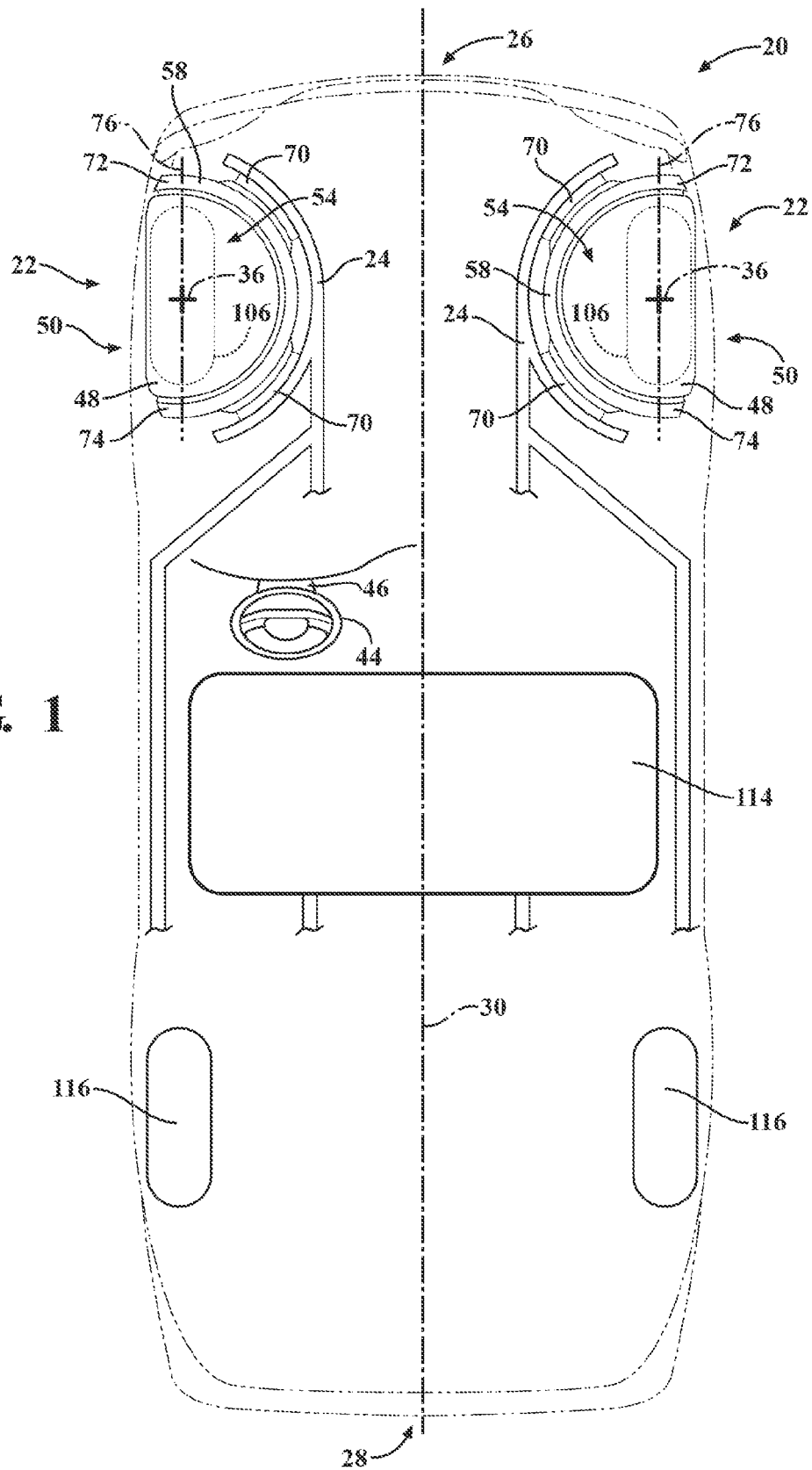
FIG. 1 is a schematic perspective view of a vehicle and a modular drive apparatus, with the modular drive apparatus in a first mode.
Figure 2:
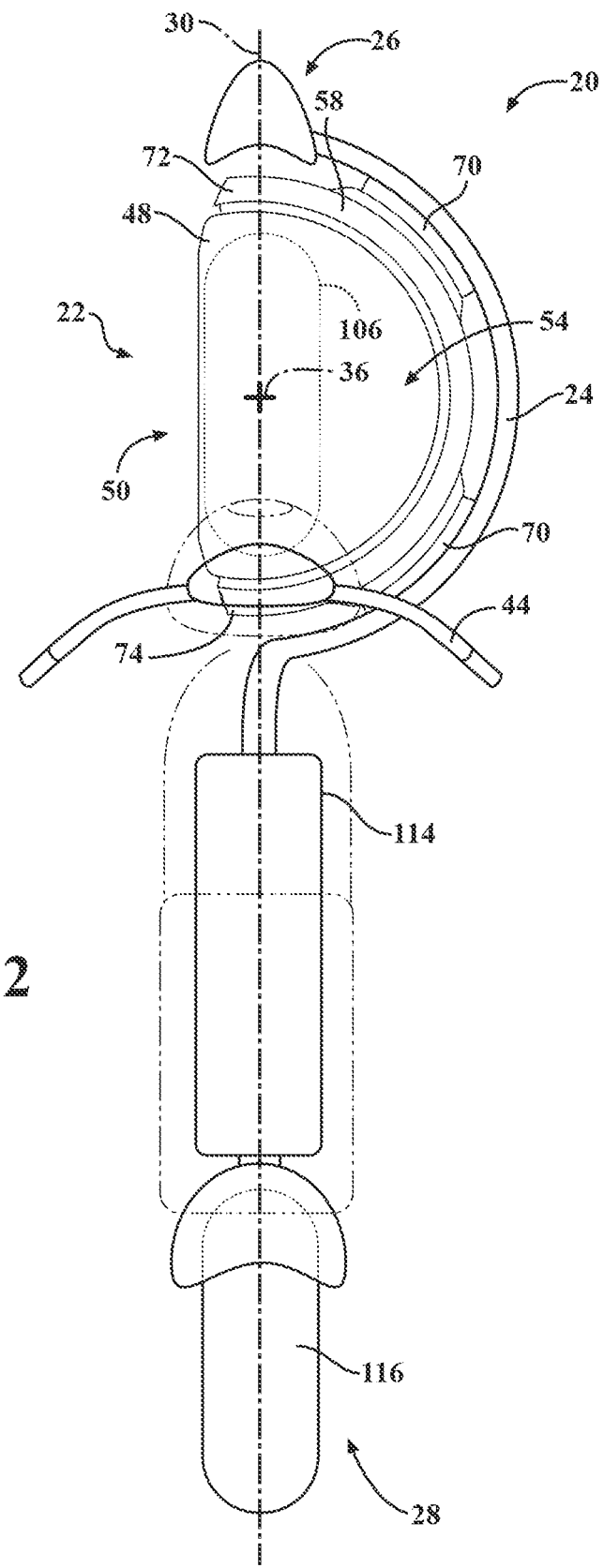
FIG. 2 is a schematic perspective view of another vehicle and the modular drive apparatus, with the modular drive apparatus in the first mode.

Referring to the Figures, wherein like numerals indicate like or corresponding parts throughout the several views, a vehicle 20 and a modular drive apparatus 22 for the vehicle 20 are generally shown. The vehicle 20 can be any suitable configuration, such as for example, a car as shown in FIG. 1; a truck; a commercial vehicle, such as a semi; a motorcycle as shown in FIG. 2; a scooter; a three-wheeled vehicle; etc. The vehicle 20 will be discussed first and the modular drive apparatus 22 will be discussed further below.

Referring to FIGS. 1 and 2, the vehicle 20 includes a component, such as a support structure 24, with the support structure 24 including a front end 26 and a back end 28 spaced from each other along a longitudinal axis 30. Generally, the front end 26 of the support structure 24 corresponds to the front end of the vehicle 20 and the back end 28 of the support structure 24 corresponds to the back end of the vehicle 20. The support structure 24 can support a driver; a passenger(s); a load, such as goods/materials, to be transported; etc. The component can be further defined as a frame, a chassis, a platform, a body, a bracket, a brace, or any other suitable component to support the modular drive apparatus 22, the driver, the passenger(s), the load, etc.

Figure 3:
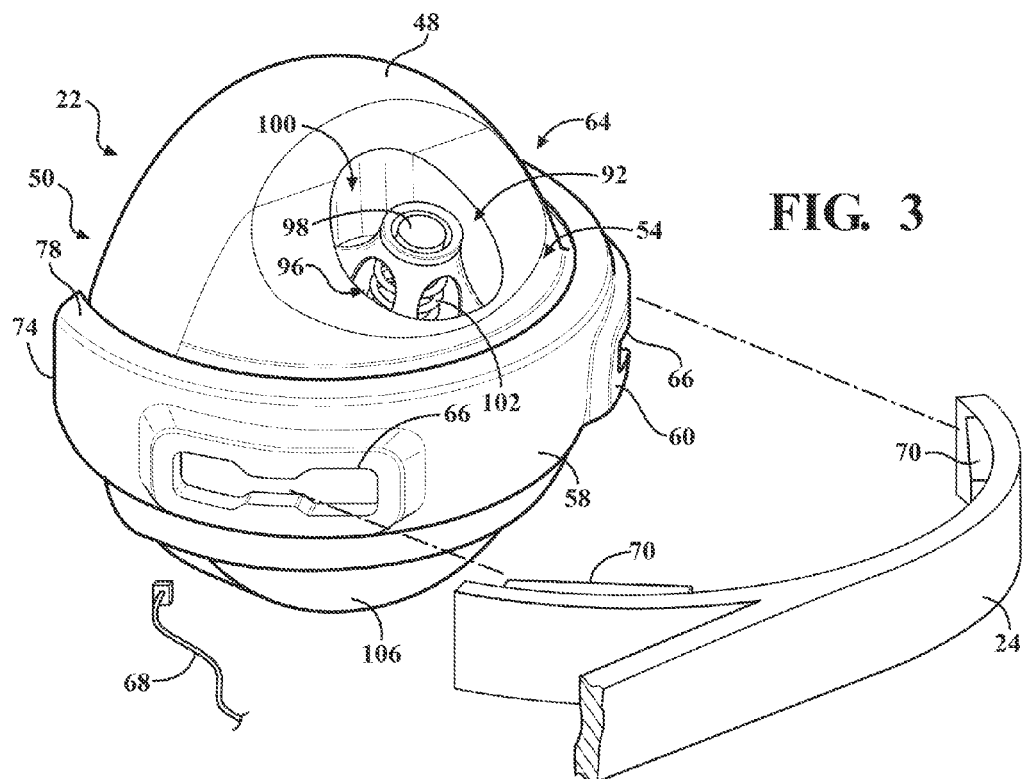
FIG. 3 is a schematic exploded perspective view of the modular drive apparatus and a coupling member, with the modular drive apparatus in a second mode.
Figure 4:
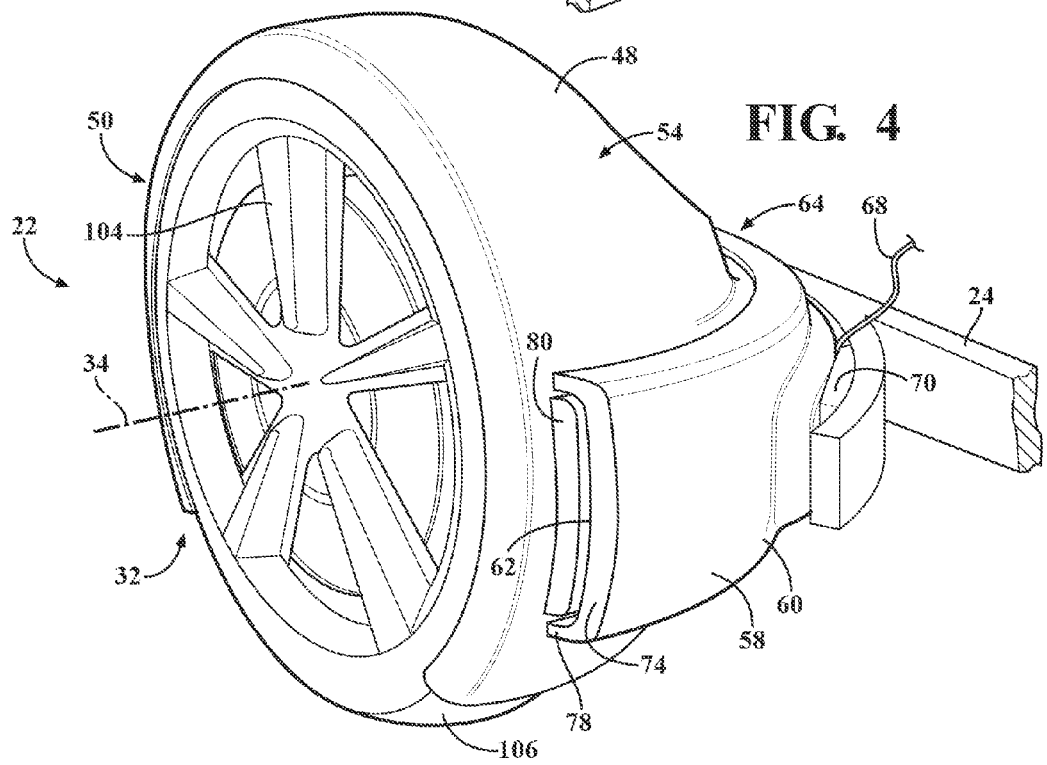
FIG. 4 is a schematic perspective view of the modular drive apparatus and the coupling member, with the modular drive apparatus in the first mode.
Figure 5:
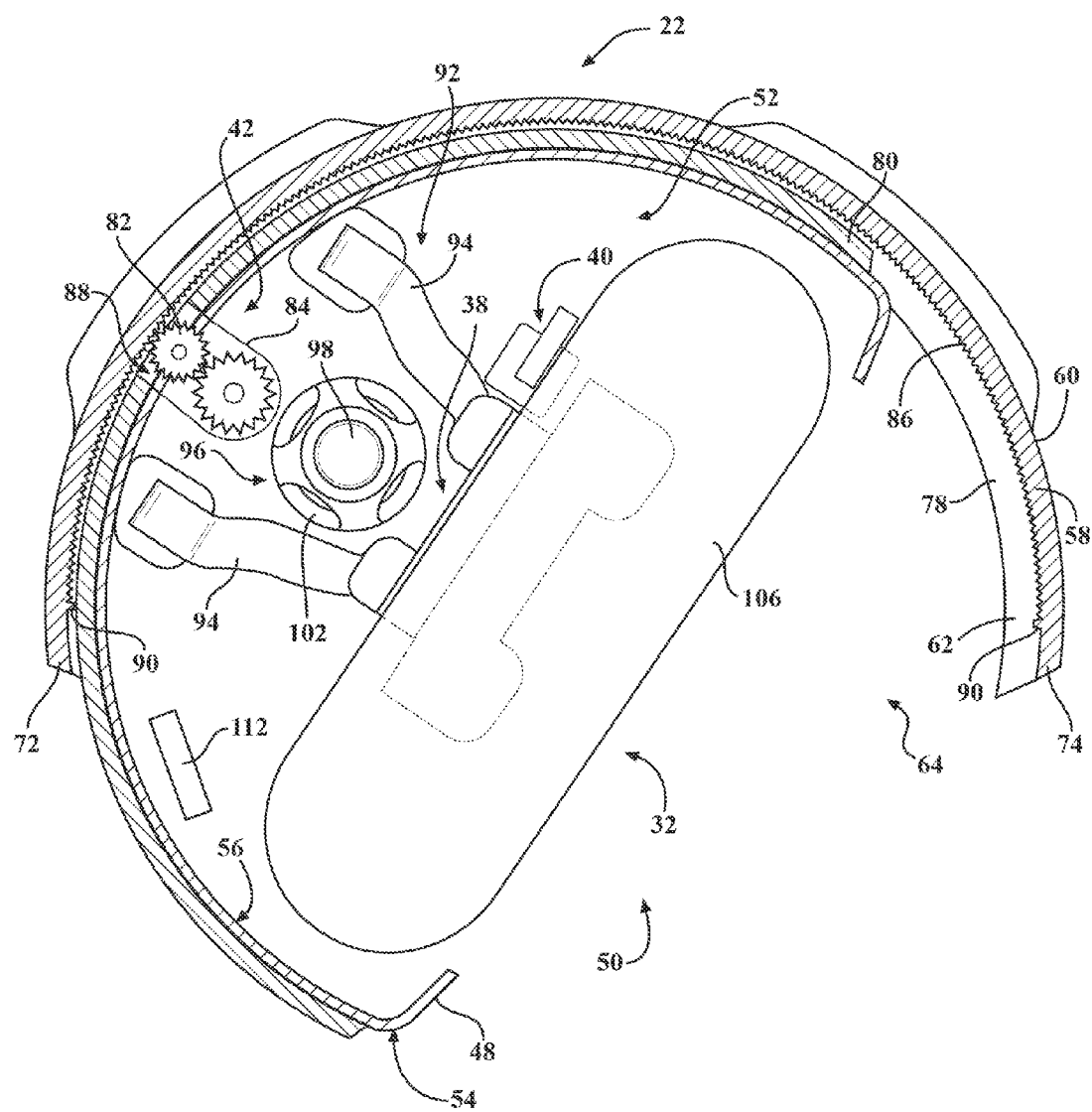
FIG. 5 is a schematic cross-sectional view of the modular drive apparatus.
Figure 8:
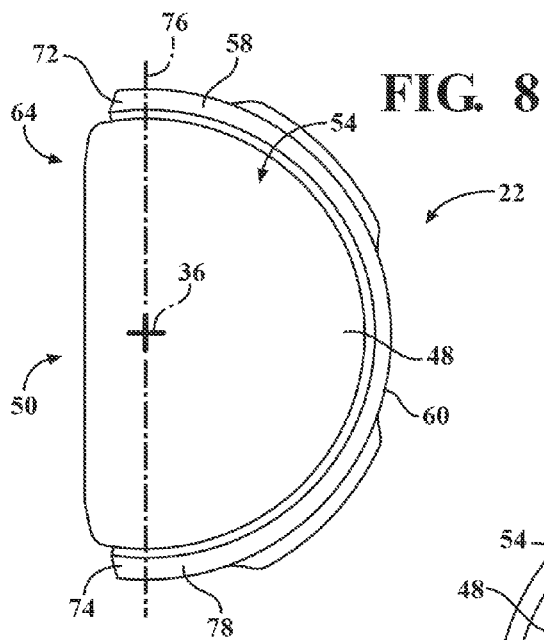
FIG. 8 is a schematic top view of the self-contained unit in an intermediate position.

Also turning to FIGS. 3-5, the vehicle 20 further includes a wheel assembly 32 coupled to the support structure 24. The wheel assembly 32 is rotatable about a central axis 34 in a first direction and a second direction opposite the first direction for moving the support structure 24 forward and backward. Simply stated, the vehicle 20 moves forward and backward when the wheel assembly 32 rotates in the first and second directions. For example, when the wheel assembly 32 rotates in the first direction, the vehicle 20, and thus the support structure 24, moves forward and when the wheel assembly 32 rotates in the second direction, the vehicle 20, and thus the support structure 24 moves backward. It is to be appreciated that the above directional example is for illustrative purposes only and the first and second directions can be reversed.

The wheel assembly 32 is also pivotable about a pivot axis 36 transverse to the central axis 34 in a third direction and a fourth direction opposite the third direction for moving the support structure 24 leftwardly and rightwardly. Simply stated, the vehicle 20 moves left and right when the wheel assembly 32 pivots in the third and fourth directions. For example, when the wheel assembly 32 pivots in the third direction, the vehicle 20, and thus the support structure 24 moves leftwardly and when the wheel assembly 32 pivots in the fourth direction, the vehicle 20, and thus the support structure 24 moves rightwardly. It is to be appreciated that the above directional example is for illustrative purposes only and the third and fourth directions can be reversed. In certain embodiments, the pivot axis 36 is perpendicular to the central axis 34. The wheel assembly 32 can simultaneously rotate about the central axis 34 and the pivot axis 36. Therefore, for example, when the wheel assembly 32 simultaneously rotates about the central and pivot axes 34, 36, the vehicle 20, and thus the support structure 24 can move forward or backward while turning left or right. Parts of the wheel assembly 32 will be discussed further below.

The vehicle 20 further includes an electric motor 38 (see FIG. 5) coupled to the wheel assembly 32 for rotating the wheel assembly 32 in the first and second directions. As such, actuation of the electric motor 38 rotates the wheel assembly 32 to move the vehicle 20 forward and backward. The electric motor 38 can include a shaft extending therefrom, with the shaft coupled to the wheel assembly 32 and rotatable about the central axis 34 for rotating the wheel assembly 32. The electric motor 38 can include any suitable part(s) for rotating the wheel assembly 32 and the part(s) of the electric motor 38 will not be discussed further. In certain embodiments, the electric motor 38 is a hub motor. It is to be appreciated that the electric motor 38 can be any suitable electric motor or any other suitable motor. The electric motor 38 is further defined as a first electric motor 38 and will be referred to as the first electric motor 38 for the below discussion.

The vehicle 20 also includes a braking device 40 (see FIG. 5) coupled to the wheel assembly 32 for braking the wheel assembly 32. For example, when the vehicle 20 is moving, actuation of the braking device 40 slows down or stops movement of the vehicle 20. As another example, when the vehicle 20 is stationary, actuation of the braking device 40 prevents the vehicle 20 from beginning to move. The braking device 40 can include a brake caliper, brake pads, a piston and cylinder, a rotor, and/or any other suitable parts for slowing down/stopping/preventing movement of the vehicle 20, and thus the support structure 24, and therefore, the parts of the braking device 40 will not be discussed further.

The vehicle 20 further includes a steering mechanism 42 coupled to the wheel assembly 32 for pivoting the wheel assembly 32 in the third and fourth directions. Simply stated, actuation of the steering mechanism 42 pivots the wheel assembly 32 in the third and fourth directions. As such, actuation of the steering mechanism 42 pivots the wheel assembly 32 to move the vehicle 20 left and right. Parts of the steering mechanism 42 will be discussed further below.

A steering wheel 44 can be coupled to the steering mechanism 42 for actuating the steering mechanism 42. Furthermore, a steering column 46 can be coupled between the steering wheel 44 and the steering mechanism 42 for actuating the steering mechanism 42 in response to movement of the steering wheel 44. For example, when a user/driver rotates the steering wheel 44, the steering column 46 rotates to actuate the steering mechanism 42 which pivots the wheel assembly 32 in the third or fourth directions. It is to be appreciated that the steering wheel 44 can be any suitable configuration, such as a wheel as shown in FIG. 1, handle bars as shown in FIG. 2, directional buttons, a joystick, etc. It is to also be appreciated that the steering wheel 44 and the steering column 46 can include any suitable parts for actuating the steering mechanism 42 and the parts of the steering wheel 44 and the steering column 46 will not be discussed further.

The vehicle 20 also includes a housing 48 receiving the wheel assembly 32, the first electric motor 38, the braking device 40, and the steering mechanism 42 to define a self-contained unit 50 attachable to and detachable from the support structure 24 or the vehicle 20, for providing interchangeability of the self-contained unit 50. More specifically, the housing 48 defines a cavity 52 receiving the wheel assembly 32, the first electric motor 38, the braking device 40, and the steering mechanism 42 to further define the self-contained unit 50. Hence, the self-contained unit 50 is attachable to and detachable from the support structure 24 for providing interchangeability of the self-contained unit 50. Simply stated, the housing 48/self-contained unit 50 is attachable to the vehicle 20 and the housing 48/self-contained unit 50 is detachable from the vehicle 20. Therefore, the housing 48/self-contained unit 50 is in a first mode when attached to the vehicle 20 or support structure 24 and the housing 48/self-contained unit 50 is in a second mode when detached from the vehicle 20 or support structure 24. The first mode is shown in FIGS. 1, 2, and 4 and the second mode is shown in FIGS. 3 and 5-10. For illustrative purposes only, various features of the housing 48/self-contained unit 50 have been removed in FIGS. 1, 2, and 8-10.

The housing 48, the wheel assembly 32, the first electric motor 38, the braking device 40, and the steering mechanism 42 are pivotable concurrently with each other about the pivot axis 36 in the third and fourth directions. Thus, the self-contained unit 50 is pivotable about the pivot axis 36 in the third and fourth directions. Therefore, when the user rotates the steering wheel 44, the housing 48, the wheel assembly 32, the first electric motor 38, the braking device 40, and the steering mechanism 42 concurrently pivot together about the pivot axis 36 in the third or further directions. Simply stated, when the user rotates the steering wheel 44, the self-contained unit 50 pivots in the third or fourth directions. It is to be appreciated that when the wheel assembly 32 rotates in the first or second directions, the housing 48, the first electric motor 38, the braking device 40, and the steering mechanism 42 do not rotate in the first or second directions.

Referring to FIG. 3-5, the housing 48 has a first surface 54 facing away from the cavity 52 and a second surface 56 disposed in the cavity 52. Generally, the second surface 56 opposes the first surface 54 of the housing 48. Therefore, the second surface 56 faces the wheel assembly 32, the first electric motor 38, the braking device 40, and the steering mechanism 42.

The vehicle 20 can further include a support 58 coupled to the housing 48 for supporting the self-contained unit 50. Generally, the support 58 is disposed outside of the housing 48. In one embodiment, the first surface 54 of the housing 48 is coupled to the support 58. It is to be appreciated that the housing 48 can be attached to the support 58 at any suitable location. The support 58 is attachable to and detachable from the support structure 24 or the vehicle 20, concurrently with the self-contained unit 50. In other words, the support 58 is attachable to and detachable from the vehicle 20 concurrently with the self-contained unit 50. As such, the housing 48/self-contained unit 50 is in the first mode when the support 58 is attached to the vehicle 20 or the support structure 24 and the housing 48/self-contained unit 50 is in the second mode when the support 58 is detached from the vehicle 20 or the support structure 24.

Furthermore, the housing 48, the wheel assembly 32, the first electric motor 38, the braking device 40, and the steering mechanism 42 are pivotable concurrently with each other about the pivot axis 36 in the third and fourth directions independently of the support 58. In other words, the self-contained unit 50 is pivotable about the pivot axis 36 in the third and fourth directions independently of the support 58. As such, the support 58 does not pivot in the third or fourth directions. In addition, the support 58 does not rotate in the first or second directions.

The support 58 has a first side 60 selectively attached to the support structure 24, and the support 58 has a second side 62 coupled to the housing 48 and opposing the first side 60. In certain embodiments, the support 58 defines a generally semi-circular configuration such that the support 58 defines a pocket 64 receiving the housing 48. In other words, the self-contained unit 50 is disposed in the pocket 64 and is pivotable relative to the support 58 within the pocket 64 in the third and fourth directions. It is to be appreciated that the support 58 can be any suitable configuration and the housing 48 can be any suitable configuration cooperating with the support 58.

The first side 60 of the support 58 defines an aperture 66 for selectively attaching the self-contained unit 50 to the support structure 24. In certain embodiments, the aperture 66 is further defined as a plurality of apertures 66 spaced from each other for selectively attaching the self-contained unit 50 to the support structure 24. In various embodiments, one of the apertures 66 is disposed through both the first and second sides 60, 62 of the support 58. In other embodiments, the plurality of apertures 66 are disposed through both of the first and second sides 60, 62 of the support 58. It is to be appreciated that the first side 60 of the support 58 can include fastener (s), coupler(s), etc. for selectively attaching the self-contained unit 50 to the support structure 24 instead of apertures 66 or in addition to apertures 66.

When one of the apertures 66 is disposed through both of the first and second sides 60, 62 of the support 58, a wire harness 68 can be disposed through the aperture 66 for electrically connecting the self-contained unit 50 with the vehicle 20. When the plurality of apertures 66 are disposed through both of the first and second sides 60, 62 of the support 58, the wire harness 68 can be disposed through either of the apertures 66. Alternatively, when the plurality of apertures 66 are disposed through both of the first and second sides 60, 62 of the support 58, one wire harness 68 can be disposed through one of the apertures 66 and another wire harness 68 can be disposed through another one of the apertures 66. It is to be appreciated that the housing 48 and the support 58 can be configured to cooperate with the wire harness 68. For example, the housing 48 can define one or more holes for receiving the wire harness 68.

The vehicle 20 can further include a coupling member 70 cooperating with the support 58 for attaching the support 58, and thus the self-contained unit 50, to the vehicle 20. More specifically, the coupling member 70 is mounted to the support structure 24. As such, the housing 48/self-contained unit 50 is in the first mode when the support 58 is attached to the coupling member 70 and the housing 48/self-contained unit 50 is in the second mode when the support 58 is detached from the coupling member 70. In certain embodiments, the coupling member 70 can be disposed in the plurality of apertures 66 for attaching the support 58 to the support structure 24. In other embodiments, the coupling member 70 is disposed in one aperture 66 for attaching the support 58 to the support structure 24. In various embodiments, the coupling member 70 can be defined as a plurality of coupling members 70, with one of the coupling members 70 disposed in one of the apertures 66 and another one of the coupling members 70 disposed in another one of the apertures 66. It is to be appreciated that the coupling member(s) 70 can be any suitable configuration and location. For example, the coupling member(s) 70 can be fastener(s), coupler(s), tab(s), hook(s), etc. It is to further be appreciated that when the first side 60 of the support utilizes fastener(s), instead of or in addition to the aperture(s) 66, the coupling member(s) 70 are attached to the fastener(s) of the first side 60. The coupling member 70 and the support 58 cooperate such that the self-contained unit 50 is easily attachable to and detachable from the vehicle 20 or the support structure 24.

As best shown in FIGS. 5-7, the support 58 includes a first end 72 and a second end 74 spaced from each other along a medial axis 76 transverse to the central and pivot axes 34, 36. Generally, the medial axis 76 is substantially parallel to the longitudinal axis 30 as shown in FIG. 1. It is to be appreciated that the medial axis 76 can be coplanar with the longitudinal axis 30. It is to also be appreciated, with regard to FIG. 2, that the longitudinal axis 30 aligns with the medial axis 76, and therefore, only the longitudinal axis 30 is identified in the figure. The aperture(s) 66 are disposed between the first and second ends 72, 74 of the support 58. The first side 60 of the support 58 faces away from the medial axis 76 and the second side 62 of the support 58 faces the medial axis 76.

The support 58 includes a first track 78 (see FIGS. 5-7) mounted thereon for guiding the housing 48 along the support 58 during pivoting of the housing 48 about the pivot axis 36. More specifically, the first track 78 is mounted to the second side 62 of the support 58 for guiding the housing 48 along the support 58 during pivoting of the housing 48 about the pivot axis 36. The first track 78 is disposed between the first and second ends 72, 74 of the support 58. In certain embodiments, the first track 78 defines a generally semi-circular configuration cooperating with the semi-circular configuration of the support 58. It is to be appreciated that the first track 78 can be any suitable configuration.

The housing 48 includes a second track 80 (see FIGS. 5-7) mounted thereon such that the second track 80 and the housing 48 concurrently pivot about the pivot axis 36. More specifically, the second track 80 is mounted to the housing 48 outside of the cavity 52 such that the second track 80 and the housing 48 concurrently pivot about the pivot axis 36. In other words, the second track 80 is mounted to the first surface 54 of the housing 48. The second track 80 cooperates with the first track 78 for guiding the second track 80 along the first track 78 during pivoting of the housing 48 about the pivot axis 36. Generally, the second track 80 is disposed in the first track 78. The second track 80, the housing 48, and thus the self-contained unit 50, pivot about the pivot axis 36 in the third and fourth directions independently of the first track 78, and thus the support 58. In certain embodiments, the second track 80 defines a generally semi-circular configuration cooperating with the semi-circular configuration of the first track 78. It is to be appreciated that the second track 80 can be any suitable configuration.

The steering mechanism 42 includes a cog 82 cooperating with the first track 78 and a second electric motor 84 coupled to the cog 82. The second electric motor 84 is coupled to the cog 82 for moving the cog 82 along the first track 78 to pivot the housing 48 about the pivot axis 36 independently of the support 58. More specifically, actuation of the second electric motor 84 rotates the cog 82 which moves the cog 82 along the first track 78 such that the housing 48 pivots about the pivot axis 36. It is to be appreciated that more than one cog 82 can be coupled to the second electric motor 84.

The second electric motor 84 can include a shaft extending therefrom, with the shaft coupled to the cog 82 and rotatable to rotate the cog 82. The second electric motor 84 can include any suitable part(s) for rotating the cog 82 and the part(s) of the second electric motor 84 will not be discussed further. It is to be appreciated that the second electric motor 84 can be any suitable electric motor or any other suitable motor. It is to further be appreciated that the steering mechanism 42 can include other part(s) to move the housing 48/self-contained unit 50 relative to the first track 78.

Also referring to FIGS. 6 and 7, the second side 62 of the support 58 includes a rack 86 adjacent to the first track 78. Generally, the rack 86 is disposed in the first track 78 and disposed between the first and second ends 72, 74 of the support 58. The cog 82 engages the rack 86 to move the housing 48 independently of the support 58 during actuation of the second electric motor 84. In certain embodiments, the housing 48 defines an opening 88 with a portion of the cog 82 disposed through the opening 88 for engaging the rack 86 of the support 58. In various embodiments, the second track 80 also defines the opening 88 such that the portion of the cog 82 is disposed through the opening 88 of the housing 48 and the second track 80 for engaging the rack 86 of the support 58.

The rack 86 can include a plurality of stops 90 spaced from each other for preventing the first track 78 from detaching from the second track 80. More specifically, the cog 82 is disposed between the stops 90 such that the stops 90 prevent the self-contained unit 50 from detaching from the support 58. When the cog 82 moves along the rack 86 and into engagement with one of the stops 90, further pivoting of the housing 48 about the pivot axis 36 in that direction is prevented. One of the stops 90 can be disposed adjacent to the first end 72 of the support 58 and another one of the stops 90 can be disposed adjacent to the second end 74 of the support 58. It is to be appreciated that the stops 90 can be any suitable configuration and location. It is to further be appreciated that the second electric motor 84 can be configured to incorporate suitable stops.

The vehicle 20 can further include a suspension mechanism 92 disposed in the cavity 52 of the housing 48 to further define the self-contained unit 50. Generally, the suspension mechanism 92 dampens movement of the vehicle 20, and thus the support structure 24 along the pivot axis 36 and/or transverse to the pivot axis 36. The suspension mechanism 92 is pivotable concurrently with the housing 48 about the pivot axis 36 in the third and fourth directions. Therefore, the housing 48 receives the suspension mechanism 92. The suspension mechanism 92 pivots concurrently with the housing 48 about the pivot axis 36 in the third and fourth directions independently of the support 58. Furthermore, the suspension mechanism 92 does not rotate in the first and second directions.

The suspension mechanism 92 includes a plurality of arms 94 each coupled to the wheel assembly 32 and attached to the second surface 56 of the housing 48. One end of the arms 94 are attached to the second surface 56 of the housing 48 and another end of the arms 94 are attached to the first electric motor 38. The arms 94 can be attached to the second surface 56 of the housing 48 by any suitable fastener(s), coupler(s), tab(s), hook(s), adhesive(s), welding, etc. It is to be appreciated that the arms 94 can be any suitable configuration and location.

The suspension mechanism 92 further includes a shock absorber 96 coupled to the wheel assembly 32 and the housing 48 for damping movement of the support structure 24 along the pivot axis 36. In other words, the shock absorber 96 dampens movement of the vehicle 20 along the pivot axis 36. It is to be appreciated that the shock absorber 96 can dampen movement of the vehicle 20, and thus the support structure 24 transverse to the pivot axis 36. Generally, the shock absorber 96 is disposed in the cavity 52 of the housing 48 and is mounted to the housing 48. The shock absorber 96 can be attached to the housing 48 by any suitable fastener(s), coupler(s), tab(s), hook(s), adhesive(s), welding, etc.

Additionally, the shock absorber 96 can be adjustable to change an amount of damping. Therefore, the shock absorber 96 can include an adjustment knob 98 and the housing 48 defines an orifice 100 intersecting the cavity 52 for receiving the shock absorber 96. Specifically, the shock absorber 96 is disposed through the orifice 100 and into the cavity 52 such that the adjustment knob 98 is disposed outside of the housing 48 for providing easy adjustment of the shock absorber 96.

The shock absorber 96 can include a biasing member 102, such as a spring. In addition, the shock absorber 96 can include a piston assembly. In certain embodiments, the biasing member 102 and the piston assembly cooperate with each other. The shock absorber 96 can be defined as an air shock and can include any other suitable part(s) for damping movement of the vehicle 20, and thus the support structure 24. It is to be appreciated that the suspension mechanism 92 can include any suitable part(s) for damping movement of the vehicle 20 and thus the support structure 24 and the part(s) of the suspension mechanism 92 will not be discussed further.

The wheel assembly 32 includes a hub 104 coupled to the first electric motor 38 and a tire 106 attached to the hub 104. As such, the hub 104 supports 58 the tire 106 and at least a portion of the hub 104 concurrently rotates with the tire 106 about the central axis 34 in the first and second directions. Generally, the first electric motor 38 is coupled to the hub 104 such that the hub 104 and the tire 106 concurrently rotate about the central axis 34 in the first and second directions in response to actuation of the first electric motor 38. Therefore, actuation of the first electric motor 38, rotates the hub 104, which rotates the tire 106 to move the vehicle 20, and thus the support structure 24 forward, backward, left, or right. Thus, the housing 48 supports one drive or powered wheel. When the housing 48/self-contained unit 50 is in the second mode, the tire 106 is detached from the vehicle 20 or the support structure 24. It is to be appreciated that the wheel assembly 32 can include any suitable part(s) for moving the vehicle 20 and the part(s) of the wheel assembly 32 will not be discussed further.

Figure 9:
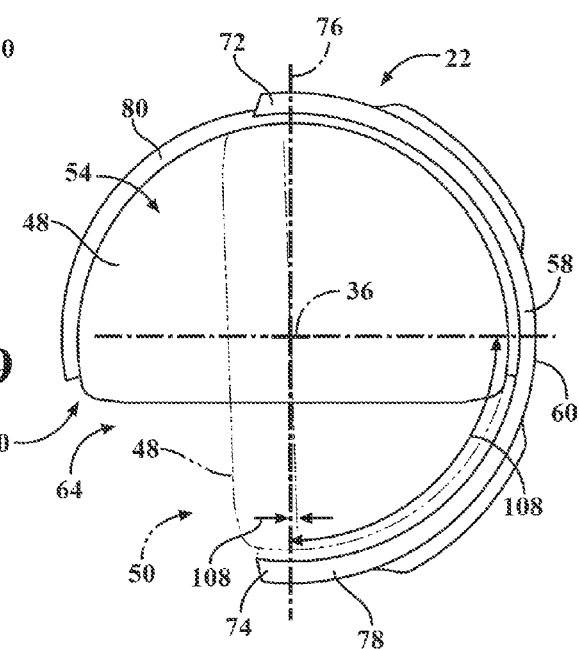
FIG. 9 is a schematic top view of the self-contained unit in the first position in solid lines and in another first position in phantom lines.
Figure 10:
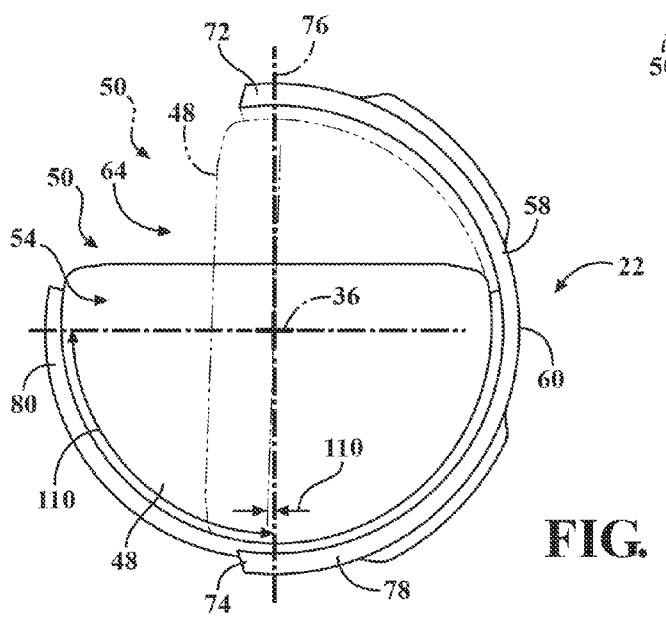
FIG. 10 is a schematic top view of the self-contained unit in the second position in solid lines and in another second position in phantom lines.

Generally, the steering mechanism 42 pivots the tire 106 to a first position in the third direction transverse to the longitudinal axis 30 and a second position in the fourth direction transverse to the longitudinal axis 30. The first position is shown in FIGS. 6 and 9 and the second position is shown in FIGS. 7 and 10. Furthermore, the steering mechanism 42 pivots the tire 106 to an intermediate position substantially parallel to the longitudinal axis 30. Hence, the intermediate position represents an angle of about 0°. The intermediate position is between the first and second positions and is shown in FIGS. 1, 2, 4, and 8.

The tire 106 is pivotable about the pivot axis 36 relative to the intermediate position to the first position in a first angle 108 from about 0° to about 90° in the third direction. Simply stated, the tire 106, and thus the wheel assembly 32, can pivot in the third direction to the first angle 108 which can be any angle from about 0° to about 90°, as shown in FIG. 9. For illustrative purposes only, FIG. 9 illustrates the self-contained unit 50 in phantom lines when the first angle 108 is about 1° and the self-contained unit 50 in solid lines when the first angle 108 is about 90°.

In addition, the tire 106 is pivotable about the pivot axis 36 relative to the intermediate position to the second position in a second angle 110 from about 0° to about −90° in the fourth direction. Simply stated, the tire 106, and thus the wheel assembly 32, can pivot in the fourth direction to the second angle 110 which can be any angle from about 0° to about −90°, as shown in FIG. 10. For illustrative purposes only, FIG. 10 illustrates the self-contained unit 50 in phantom lines when the second angle 110 is about −1° and the self-contained unit 50 in solid lines when the second angle 110 is about −90°. It is to be appreciated that the first and second angles 108, 110 can be reversed such that the first angle 108 can be from about 0° to about −90° and the second angle 110 can be from about 0° to about 90°.

Said differently, the steering mechanism 42 pivots the tire 106 to the first position in the third direction transverse to the medial axis 76 and the second position in the fourth direction transverse to the medial axis 76. Therefore, the steering mechanism 42 pivots the tire 106 to the intermediate position substantially parallel to the medial axis 76. Hence, the intermediate position represents an angle of about 0°. As such, the tire 106 is pivotable about the pivot axis 36 relative to the intermediate position to the first position in the first angle 108 from about 0° to about 90° in the third direction. As discussed above, the tire 106, and thus the wheel assembly 32, can pivot in the third direction to the first angle 108 which can be any angle from about 0° to about 90°. Additionally, the tire 106 is pivotable about the pivot axis 36 relative to the intermediate position to the second position in the second angle 110 from about 0° to about −90° in the fourth direction. As also discussed above, the tire 106, and thus the wheel assembly 32, can pivot in the fourth direction to the second angle 110 which can be any angle from about 0° to about −90°. It is to be appreciated that the first and second angles 108, 110 can be reversed as discussed above.

Referring to FIG. 6, the tire 106, and thus the self-contained unit 50, is pivoted to about 90° in the third direction and referring to FIG. 7, the tire 106, and thus the self-contained unit 50, is pivoted to about −90° in the fourth direction. Hence, the tire 106 can pivot a maximum of about 180° between the third and fourth directions. Correspondingly, the housing 48, and thus the self-contained unit 50, can pivot a maximum of about 180° between the third and fourth directions concurrently with the tire 106. As such, the self-contained unit 50 provides a wide range of motion which therefore provides a wide range of movement or maneuverability of the vehicle 20.

Referring back to FIG. 5, the vehicle 20 can also include a control system 112 disposed in the cavity 52 of the housing 48 to further define the self-contained unit 50. The control system 112 is pivotable concurrently with the housing 48 about the pivot axis 36 in the third and fourth directions. Therefore, the housing 48 receives the control system 112. The control system 112 pivots concurrently with the housing 48 about the pivot axis 36 in the third and fourth directions independently of the support 58. Furthermore, the control system 112 does not rotate in the first and second directions.

The control system 112 is in communication with the first electric motor 38, the braking device 40, and the steering mechanism 42 for controlling actuation of the first electric motor 38, the braking device 40, and the steering mechanism 42. More specifically, the control system 112 is in communication with the first and second electric motors 38, 84 and the braking device 40 for controlling actuation of the first and second electric motors 38, 84 the braking device 40. Generally, the control system 112 is in electrical communication with the wire harness 68. In certain embodiments, the control system 112 can be a drive-by-wire control system. The control system 112 can include any suitable part(s), such as computer chip(s), etc. for controlling actuation of various motors, devices, mechanisms, assemblies, etc. and the part(s) of the control system 112 will not be discussed further.

The housing 48, the wheel assembly 32, the first and second electric motors 38, 84, the braking device 40, the steering mechanism 42, the suspension mechanism 92, and the control system 112 are pivotable concurrently with each other about the pivot axis 36 in the third and fourth directions independently of the support 58. Therefore, the housing 48, the wheel assembly 32, the first and second electric motors 38, 84, the braking device 40, the steering mechanism 42, the suspension mechanism 92, and the control system 112 define the self-contained unit 50. Said differently, the housing 48, the wheel assembly 32, the first and second electric motors 38, 84, the braking device 40, the steering mechanism 42, the suspension mechanism 92, and the control system 112 are concurrently attachable to and concurrently detachable from the support structure 24. Hence, the self-contained unit 50 is attachable to and detachable from the support structure 24 for providing interchangeability of the self-contained unit 50. Therefore, the housing 48/self-contained unit 50 is in the first mode when attached to the vehicle 20 or the support structure 24 and the housing 48/self-contained unit 50 is in the second mode when detached from the vehicle 20 or the support structure 24.

Turning to FIGS. 1 and 2, the vehicle 20 can further include a battery 114 attached to the support structure 24 for supplying current to the first and second electric motors 38, 84, the braking device 40, and the control system 112. Generally, the self-contained unit 50 is in electrical communication with the battery 114 to supply current or power to the self-contained unit 50. The wire harness 68 can provide electrical communication from the battery 114 to the self-contained unit 50. The battery 114 can be defined as a plurality of batteries 114 to present a battery pack. It is to be appreciated that any suitable battery, power supply, fuel cell, extended range electric vehicle (EREV), etc. can be utilized to provide current/power to the first and second electric motors 38, 84, the braking device 40, the control system 112, and/or to provide current/power to any other suitable motor(s), device(s), mechanism(s), assemblies, control(s). It is to further be appreciated that the battery 114 can be any suitable configuration and attached to the vehicle 20 at any suitable location.

Turning to the modular drive apparatus 22, this apparatus 22 includes a number of the features discussed above. Specifically, the modular drive apparatus 22 includes the wheel assembly 32, the first electric motor 38, the braking device 40, the steering mechanism 42, and the housing 48 as discussed above. The modular drive apparatus 22 can further include the support 58 as discussed above. In addition, the modular drive apparatus 22 can include the suspension mechanism 92, and the control system 112 as discussed above. The modular drive apparatus 22 is in electrical communication with the battery 114 to supply current or power to the modular drive apparatus 22 as discussed above and can utilize the wire harness 68 as discussed above.

Briefly, therefore, the housing 48 receives the wheel assembly 32, the first electric motor 38, the braking device 40, and the steering mechanism 42 to define the self-contained unit 50 of the modular drive apparatus 22 for attaching to and detaching from the support structure 24 to provide interchangeability of the self-contained unit 50 of the modular drive apparatus 22. More specifically, the housing 48 receives the wheel assembly 32, the first and second electric motors 38, 84, the braking device 40, the steering mechanism 42, the suspension mechanism 92, and the control system 112 to further define the self-contained unit 50. As such, the wheel assembly 32, the first and second electric motors 38, 84, the braking device 40, the steering mechanism 42, the suspension mechanism 92, and the control system 112 are disposed in the cavity 52 of the housing 48 of the modular drive apparatus 22.

The housing 48, the wheel assembly 32, the first electric motor 38, the braking device 40, and the steering mechanism 42 are pivotable concurrently with each other about the pivot axis 36 in the third and fourth directions independently of the support 58. And more specifically, the housing 48, the wheel assembly 32, the first and second electric motors 38, 84, the braking device 40, the steering mechanism 42, the suspension mechanism 92, and the control system 112 are pivotable concurrently with each other about the pivot axis 36 in the third and fourth directions independently of the support 58. Furthermore, the support 58, the housing 48, the first and second electric motors 38, 84, the braking device 40, the steering mechanism 42, the suspension mechanism 92, and the control system 112 do not rotate in the first and second directions.

The modular drive apparatus 22 is in the first mode when attached to the vehicle 20 or the support structure 24 and the modular drive apparatus 22 is in the second mode when detached from the vehicle 20 or the support structure 24. More specifically, the modular drive apparatus 22 is in the first mode when the support 58 is attached to the vehicle 20 or the support structure 24 and the modular drive apparatus 22 is in the second mode when the support 58 is detached from the vehicle 20 or the support structure 24. Even more specifically, the modular drive apparatus 22 is in the first mode when the support 58 is attached to the coupling member 70 and the modular drive apparatus 22 is in the second mode when the support 58 is detached from the coupling member 70. Therefore, the coupling member 70 and the support 58 cooperate such that the modular drive apparatus 22 is easily attachable to and detachable from the vehicle 20 or the support structure 24.

Having the modular drive apparatus 22 attachable to and detachable from the vehicle 20 or the support structure 24 provides for interchangeability or replaceability of the modular drive apparatus 22 with another modular drive apparatus 22. Therefore, the modular drive apparatus 22 provides a universal configuration easily attachable to and detachable from a wide range of vehicles 20 utilizing the apparatus 22. If the modular drive apparatus 22 needed servicing, the modular drive apparatus 22 can be detached from the vehicle 20 which can provide a more friendly work environment for servicing the apparatus 22. Additionally, if the modular drive apparatus 22 needed servicing, the user could request replacing the modular drive apparatus 22 with new modular drive apparatus 22 instead of waiting for servicing to be completed. In addition, the modular drive apparatus 22 provides a wide range of movement or maneuverability of the vehicle 20 as the self-contained unit 50 can pivot the maximum of about 180° between the third and fourth directions concurrently with the tire 106. In addition, the modular drive apparatus 22 can simplify or remove drivetrain encumbrances by self-containing the wheel assembly 32, the first and second electric motors 38, 84, the braking device 40, the steering mechanism 42, the suspension mechanism 92, and the control system 112.

FIG. 2 illustrates the vehicle 20, embodied as a motorcycle, utilizing one modular drive apparatus 22 and one non-powered wheel 116. It is to be appreciated that more than one modular drive apparatus 22 can be utilized with the vehicle 20. For example, the motorcycle could utilize another modular drive apparatus 22 instead of the non-powered wheel 116. As another example, if a front-wheel drive vehicle 20 is desired, as shown in FIG. 1, two modular drive apparatuses 22 can be utilized, with one modular drive apparatus 22 coupled to the support structure 24 at the left front end 26 of the vehicle 20 and another modular drive apparatus 22 coupled to the support structure 24 at the right front end 26 of the vehicle 20. In addition, with this front-wheel drive example, a pair of non-powered wheels 116 can be utilized such that one of the wheels 116 is coupled to the support structure 24 at the left back end 28 of the vehicle 20 and another one of the wheels 116 is coupled to the support structure 24 at the right back end 28 of the vehicle 20. As yet another example, if a four-wheel drive vehicle 20 is desired, four modular drive apparatuses 22 can be utilized. Therefore, a wide range of vehicles 20 can utilize the modular drive apparatus 22. It is to be appreciated that the modular drive apparatus 22 can be attached to the vehicle 20/support structure 24 in any suitable location.

While the best modes for carrying out the disclosure have been described in detail, those familiar with the art to which this disclosure relates will recognize various alternative designs and embodiments for practicing the disclosure within the scope of the appended claims.

The invention claimed is:

1. A vehicle comprising:
a support structure;
a wheel assembly coupled to the support structure and rotatable about a central axis in a first direction and a second direction opposite the first direction for moving the support structure forward and backward, with the wheel assembly pivotable about a pivot axis transverse to the central axis in a third direction and a fourth direction opposite the third direction for moving the support structure leftwardly and rightwardly;
an electric motor coupled to the wheel assembly for rotating the wheel assembly in the first and second directions;
a braking device coupled to the wheel assembly for braking the wheel assembly;
a steering mechanism coupled to the wheel assembly for pivoting the wheel assembly in the third and fourth directions;
a housing receiving the wheel assembly, the electric motor, the braking device, and the steering mechanism to define a self-contained unit attachable to and detachable from the support structure for providing interchangeability of the self-contained unit; and
a support coupled to the housing for supporting the self-contained unit, with the housing pivotable about the pivot axis independently of the support.

2. A vehicle as set forth in claim 1 wherein the support is disposed outside of the housing and attachable to and detachable from the support structure concurrently with the self-contained unit.

3. A vehicle as set forth in claim 2 wherein the housing defines a cavity receiving the wheel assembly, the electric motor, the braking device, and the steering mechanism to further define the self-contained unit, wherein the housing, the wheel assembly, the electric motor, the braking device, and the steering mechanism are pivotable concurrently with each other about the pivot axis in the third and fourth directions independently of the support.

4. A vehicle as set forth in claim 2 wherein the support has a first side selectively attached to the support structure, the support has a second side coupled to the housing and opposing the first side, and the support includes a first track mounted to the second side of the support for guiding the housing along the support during pivoting of the housing about the pivot axis.

5. A vehicle as set forth in claim 4 wherein the housing includes a second track mounted thereon such that the second track and the housing concurrently pivot about the pivot axis, and the second track cooperates with the first track for guiding the second track along the first track during pivoting of the housing about the pivot axis.

6. A vehicle as set forth in claim 4 wherein the electric motor is further defined as a first electric motor, wherein the steering mechanism includes a cog cooperating with the first track and a second electric motor coupled to the cog for moving the cog along the first track to pivot the housing about the pivot axis independently of the support, and wherein the second side of the support includes a rack adjacent to the first track, with the cog engaging the rack to move the housing independently of the support during actuation of the second electric motor.

7. A vehicle as set forth in claim 1 wherein the housing defines a cavity receiving the wheel assembly, the electric motor, the braking device, and the steering mechanism to further define the self-contained unit, wherein the housing, the wheel assembly, the electric motor, the braking device, and the steering mechanism are pivotable concurrently with each other about the pivot axis in the third and fourth directions, and wherein the housing has a first surface facing away from the cavity and a second surface disposed in the cavity.

8. A vehicle as set forth in claim 7 further including a suspension mechanism disposed in the cavity of the housing to further define the self-contained unit and pivotable concurrently with the housing about the pivot axis in the third and fourth directions, wherein the suspension mechanism includes a plurality of arms each coupled to the wheel assembly and attached to the second surface of the housing, and wherein the suspension mechanism includes a shock absorber coupled to the wheel assembly and the housing for damping movement of the support structure along the pivot axis.

9. A vehicle as set forth in claim 8 wherein the wheel assembly includes a hub and a tire attached to the hub, with the electric motor coupled to the hub such that the hub and the tire concurrently rotate about the central axis in the first and second directions in response to actuation of the electric motor.

10. A vehicle as set forth in claim 9 wherein the support structure includes a front end and a back end spaced from each other along a longitudinal axis, and wherein the steering mechanism pivots the tire to a first position in the third direction transverse to the longitudinal axis and a second position in the fourth direction transverse to the longitudinal axis, with the steering mechanism pivoting the tire to an intermediate position substantially parallel to the longitudinal axis to represent an angle of about 0°, and the tire being pivotable about the pivot axis relative to the intermediate position to the first position in a first angle from about 0° to about 90° in the third direction and the tire being pivotable about the pivot axis relative to the intermediate position to the second position in a second angle from about 0° to about −90° in the fourth direction.

11. A vehicle as set forth in claim 7 further including a control system disposed in the cavity of the housing to further define the self-contained unit and pivotable concurrently with the housing about the pivot axis in the third and fourth directions, and the control system in communication with the electric motor, the braking device, and the steering mechanism for controlling actuation of the electric motor, the braking device, and the steering mechanism.

12. A modular drive apparatus for a vehicle, the apparatus comprising:
    a wheel assembly rotatable about a central axis in a first direction and a second direction opposite the first direction for moving the vehicle forward and backward, with the wheel assembly pivotable about a pivot axis transverse to the central axis in a third direction and a fourth direction opposite the third direction for moving the vehicle leftwardly and rightwardly;
    an electric motor coupled to the wheel assembly for rotating the wheel assembly in the first and second directions;
    a braking device coupled to the wheel assembly for braking the wheel assembly;
    a steering mechanism coupled to the wheel assembly for pivoting the wheel assembly in the third and fourth directions;
    a housing receiving the wheel assembly, the electric motor, the braking device, and the steering mechanism to define a self-contained unit for attaching to and detaching from the vehicle to provide interchangeability of the self-contained unit; and
    a support coupled to the housing for supporting the self-contained unit, with the housing pivotable about the pivot axis independently of the support.

13. An apparatus as set forth in claim 12 wherein the support is disposed outside of the housing for attaching to and detaching from the vehicle concurrently with the self-contained unit.

14. An apparatus as set forth in claim 13 wherein the housing defines a cavity receiving the wheel assembly, the electric motor, the braking device, and the steering mechanism to further define the self-contained unit, wherein the housing, the wheel assembly, the electric motor, the braking device, and the steering mechanism are pivotable concurrently with each other about the pivot axis in the third and fourth directions independently of the support.

15. An apparatus as set forth in claim 13 wherein the support has a first side and a second side opposing the first side, with the second side coupled to the housing, and the support includes a first track mounted to the second side of the support for guiding the housing along the support during pivoting of the housing about the pivot axis, and the housing includes a second track mounted thereon such that the second track and the housing concurrently pivot about the pivot axis, and the second track cooperates with the first track for guiding the second track along the first track during pivoting of the housing about the pivot axis.

16. An apparatus as set forth in claim 15 wherein the electric motor is further defined as a first electric motor, and wherein the steering mechanism includes a cog cooperating with the first track and the steering mechanism includes a second electric motor coupled to the cog for moving the cog along the first track to pivot the housing about the pivot axis independently of the support, and wherein the second side of the support includes a rack adjacent to the first track, with the cog engaging the rack to move the housing independently of the support during actuation of the second electric motor.

17. An apparatus as set forth in claim 12 wherein the wheel assembly includes a hub coupled to the electric motor and a tire attached to the hub, with the hub and the tire concurrently rotatable about the central axis in the first and second directions in response to actuation of the electric motor.

18. An apparatus as set forth in claim 17 wherein the support includes a first end and a second end spaced from each other along a medial axis transverse to the central and pivot axes, and wherein the steering mechanism pivots the tire to a first position in the third direction transverse to the medial axis and a second position in the fourth direction transverse to the medial axis, with the steering mechanism pivoting the tire to an intermediate position substantially parallel to the medial axis to represent an angle of about 0°, and the tire being pivotable about the pivot axis relative to the intermediate position to the first position in a first angle from about 0° to about 90° in the third direction and the tire being pivotable about the pivot axis relative to the intermediate position to the second position in a second angle from about 0° to about −90° in the fourth direction.

19. An apparatus as set forth in claim 12 wherein the housing defines a cavity receiving the wheel assembly, the electric motor, the braking device, and the steering mechanism to further define the self-contained unit, and further including a suspension mechanism and a control system each disposed in the cavity of the housing to further define the self-contained unit, with the housing, the wheel assembly, the electric motor, the braking device, the steering mechanism, the suspension mechanism, and the control system pivotable concurrently with each other about the pivot axis in the third and fourth directions, and the control system in communication with the electric motor, the braking device, and the steering mechanism for controlling actuation of the electric motor, the braking device, and the steering mechanism.

20. A vehicle comprising:
    a support structure including a front end and a back end spaced from each other along a longitudinal axis;
    a wheel assembly coupled to the support structure and rotatable about a central axis in a first direction and a second direction opposite the first direction for moving the support structure forward and backward, wherein the wheel assembly is pivotable about a pivot axis transverse to the central axis in a third direction and a fourth direction opposite the third direction for moving the support structure leftwardly and rightwardly;
    a first electric motor coupled to the wheel assembly for rotating the wheel assembly in the first and second directions;
    a braking device coupled to the wheel assembly for braking the wheel assembly;
    a steering mechanism coupled to the wheel assembly for pivoting the wheel assembly in the third and fourth directions; and
    a housing defining a cavity receiving the wheel assembly, the first electric motor, the braking device, and the steering mechanism to define a self-contained unit attachable to and detachable from the support structure for providing interchangeability of the self-contained unit;
    a support coupled to the housing for supporting the self-contained unit, and the support being disposed outside of the housing and attachable to and detachable from the support structure concurrently with the self-contained unit;

wherein the support includes a first track mounted thereon for guiding the housing along the support during pivoting of the housing about the pivot axis;

wherein the housing includes a second track mounted to the housing outside of the cavity such that the second track and the housing concurrently pivot about the pivot axis, and the second track cooperates with the first track for guiding the second track along the first track during pivoting of the housing about the pivot axis;

the steering mechanism includes a cog cooperating with the first track and a second electric motor coupled to the cog for moving the cog along the first track to pivot the housing about the pivot axis independently of the support;

a suspension mechanism disposed in the cavity of the housing to further define the self-contained unit, and the suspension mechanism includes a shock absorber coupled to the wheel assembly and the housing for damping movement of the support structure along the pivot axis;

the wheel assembly includes a hub coupled to the first electric motor and a tire attached to the hub, with the hub and the tire concurrently rotatable about the central axis in the first and second directions in response to actuation of the first electric motor;

wherein the steering mechanism pivots the tire to a first position in the third direction transverse to the longitudinal axis and a second position in the fourth direction transverse to the longitudinal axis, with the steering mechanism pivoting the tire to an intermediate position substantially parallel to the longitudinal axis to represent an angle of about 0°, and the tire being pivotable about the pivot axis relative to the intermediate position to the first position in a first angle from about 0° to about 90° in the third direction and the tire being pivotable about the pivot axis relative to the intermediate position to the second position in a second angle from about 0° to about −90° in the fourth direction;

a control system disposed in the cavity of the housing to further define the self-contained unit, and the control system in communication with the first and second electric motors and the braking device for controlling actuation of the first and second electric motors and the braking device;

a battery attached to the support structure for supplying current to the first and second electric motors, the braking device, and the control system;

the housing, the wheel assembly, the first and second electric motors, the braking device, the steering mechanism, the suspension mechanism, and the control system being pivotable concurrently with each other about the pivot axis in the third and fourth directions independently of the support.

* * * * *